United States Patent [19]

Haug

[11] Patent Number: 4,673,317

[45] Date of Patent: * Jun. 16, 1987

[54] SHAPER CUTTER WITH REPLACEABLE CUTTING WAFER

[75] Inventor: Edward W. Haug, Rockford, Ill.

[73] Assignee: Barber-Colman Company, Rockford, Ill.

[*] Notice: The portion of the term of this patent subsequent to Mar. 18, 2003 has been disclaimed.

[21] Appl. No.: 827,648

[22] Filed: Feb. 10, 1986

Related U.S. Application Data

[63] Continuation-in-part of Ser. No. 615,775, May 31, 1984, Pat. No. 4,576,527, which is a continuation-in-part of Ser. No. 515,795, Jul. 21, 1983, abandoned.

[51] Int. Cl.$^4$ ............................................. B23F 21/28
[52] U.S. Cl. .................................. 407/28; 76/101 R; 76/DIG. 6
[58] Field of Search .................................. 407/21–29, 407/32; 76/101 R, 101 A, DIG. 6, DIG. 7

[56] References Cited

U.S. PATENT DOCUMENTS

| | | | |
|---|---|---|---|
| 579,570 | 3/1897 | Fellows | 407/28 |
| 2,171,325 | 8/1939 | Hawgood | 407/27 |
| 2,667,090 | 1/1954 | Martin | 76/101 A |
| 3,541,910 | 11/1970 | Murray | 76/101 A |
| 3,812,755 | 5/1974 | Danielsen | 407/32 |
| 4,023,246 | 5/1977 | Haug | 407/25 |
| 4,506,816 | 3/1985 | Roccaforte | 76/DIG. 6 |
| 4,576,527 | 3/1986 | Haug | 407/28 |
| 4,629,377 | 12/1986 | Tlaker et al. | 407/28 |

Primary Examiner—Nicholas P. Godici
Assistant Examiner—Jerry Kearns
Attorney, Agent, or Firm—Leydig, Voit & Mayer, Ltd.

[57] ABSTRACT

A shaper cutter includes a conical body having teeth formed around its periphery and further includes a thin wafer disposed against the face of the body and formed with peripheral cutting teeth which lie against the teeth of the body, the teeth of the wafer serving to cut a workpiece and being backed by the teeth of the body. The wafer is bonded to the face of the body by a high strength adhesive which may be heated to destroy the bond and enable removal and replacement of the wafer when the cutting teeth thereof become worn. As a result of bonding the wafer directly to the body, there are no clamps creating axial interference ahead of the wafer and, in addition, lateral deflection of the wafer teeth during cutting is reduced.

6 Claims, 4 Drawing Figures

U.S. Patent   Jun. 16, 1987   4,673,317
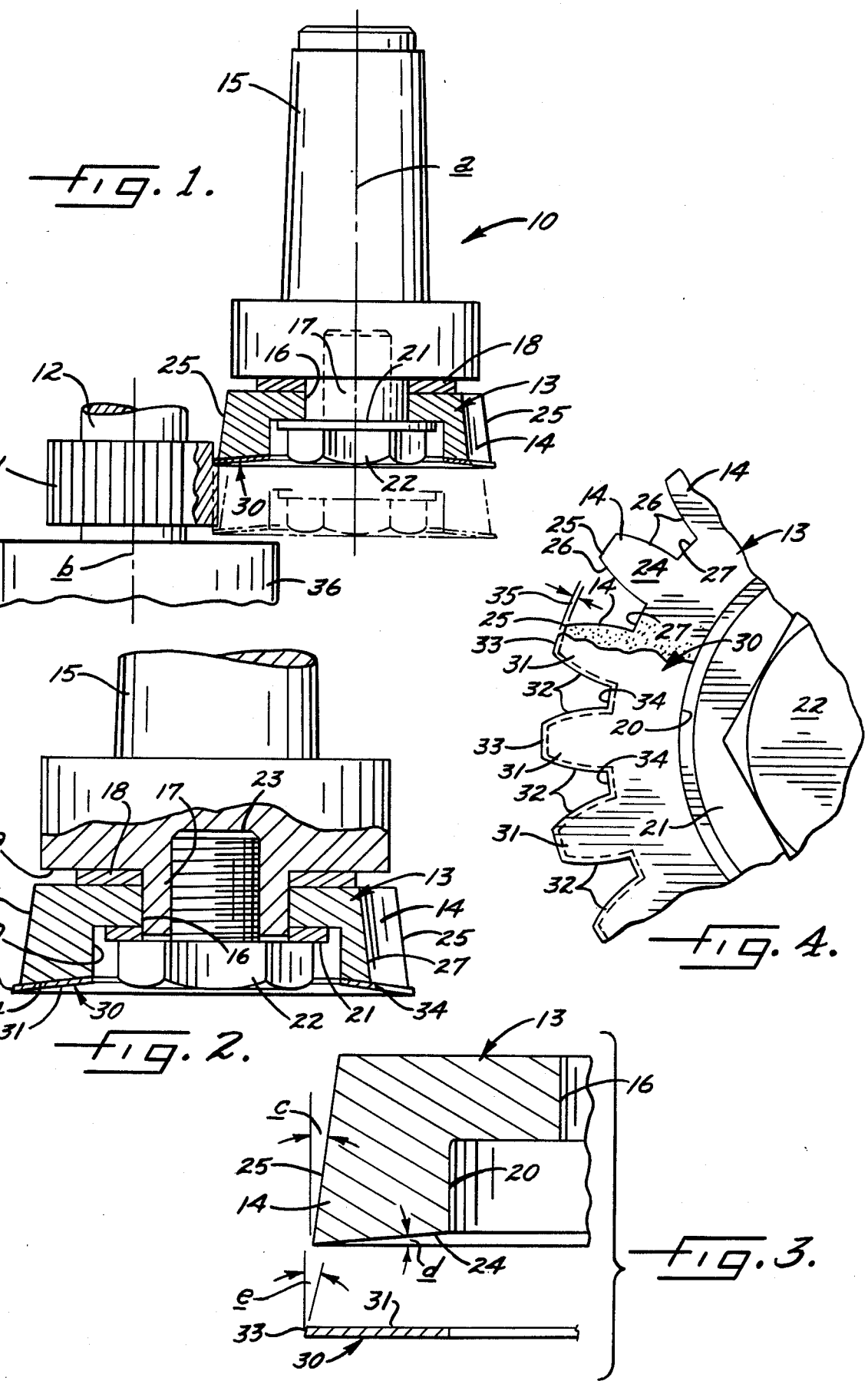

4,673,317

SHAPER CUTTER WITH REPLACEABLE CUTTING WAFER

CROSS-REFERENCE TO RELATED APPLICATIONS

This application is a continuation-in-part of my U.S. application Ser. No. 615,775, filed May 31, 1984, now U.S. Pat. No. 4,576,527, which, in turn, is a continuation-in-part of my U.S. application Ser. No. 515,795, filed July 21, 1983, now abandoned.

BACKGROUND OF THE INVENTION

This invention relates to a cutter for a shaper and, more particularly, to a cutter for cutting irregular shapes such as the teeth of a gear. Customarily, such cutters include a body with a plurality of teeth spaced angularly around the periphery of the body. The ends, sides and roots of the teeth are inclined radially inwardly from the face of the body so that the edges of the teeth constitute the cutting edges of the cutter. Frequently, the cutter is surface coated as with a thin film of titanium nitride.

When the cutting edges of most present commercially used shaper cutters become dull, they are resharpened by grinding the face of the tool and hence the faces of the teeth. Such grinding presents a number of difficulties. For one thing, because the ends, sides and roots of the teeth are inclined, the grinding changes the relationship between the cutter and the workpiece and thus the original set-up of the cutter and the work must be adjusted to compensate for this. Also, it is difficult to achieve a high quality of sharpening as compared with the sharpening performed at the point of manufacture. In addition, where the cutter is coated, the cutting edges and surfaces are no longer coated after grinding.

My prior U.S. application Ser. No. 615,775, filed May 31, 1984, now U.S. Pat. No. 4,576,527 discloses a shaper cutter which overcomes the foregoing problems. In the cutter disclosed in that patent, teeth with cutting edges are formed on a thin flexible wafer which is attached to and conforms with the teeth and face of a tool holder, the latter being basically the same as the cutting body of prior cutters and serving to back the cutting teeth of the wafer. When the cutting edges become dull, the thin wafer is simply removed and replaced with a new one. To attach the wafer to the tool holder in conformity with the teeth and face thereof, provision is made of a clamping ring adapted to lie against the end face of the wafer. When a fastener is tightened, the clamping ring flexes the thin wafer into conformity with the tool body and clamps the wafer and the body in assembled relationship.

In the cutter of my patent, the clamping ring projects ahead of the wafer and creates a potential source of axial interference when the cutter is advanced through its cutting stroke. In addition, the clamping ring is not capable of preventing lateral deflection of an extremely thin wafer when heavy cutting forces are exerted on the wafer.

SUMMARY OF THE INVENTION

The general aim of the present invention is to provide a new and improved shaper cutter of the foregoing type in which the working face of the removable wafer is completely free of obstructions so as to eliminate any possibility of axial interference during the shaping operation.

Another object of the invention is to attach the wafer to the tool body in a more rigid manner in order to reduce lateral or circumferential deflection of the wafer teeth under heavy cutting loads.

A more detailed object of the invention is to achieve the foregoing by bonding the wafer in direct face-to-face relation with the tool body through the use of a layer of high strength adhesive which may be heated to a high temperature to destroy the bond and enable removal and replacement of the wafer. By virtue of the wafer being bonded directly to the tool body, clamps and the like are eliminated along with the axial interference created by such clamps and, at the same time, there is effected such a rigid and secure attachment between the body and the wafer that the wafer teeth experience less lateral deflection during the cutting stroke.

The invention also resides in using the layer of adhesive to hold an initially flat wafer in a flexed concave condition and in intimate conformity with a tool body having a concave end face.

These and other objects and advantages of the invention will become more apparent from the following detailed description when taken in conjunction with the accompanying drawings.

BRIEF DESCRIPTION OF THE DRAWINGS

FIG. 1 is a side elevational view showing a cutter incorporating the features of the present invention mounted on a spindle of a shaper and cutting a gear, certain parts of the cutter being broken away and shown in section.

FIG. 2 is an enlarged fragmentary cross-sectional view of the cutter and spindle shown in FIG. 1.

FIG. 3 is an enlarged fragmentary exploded view of the marginal portion of the wafer and the cutter body, the parts being shown in section.

FIG. 4 is an enlarged fragmentary end view showing several teeth of the cutter.

DETAILED DESCRIPTION OF THE PREFERRED EMBODIMENT

Although the invention is applicable to tools for cutting various workpieces of irregular shape, it is shown in the drawings for purposes of illustration as embodied in a shaper cutter 10 for cutting teeth on a workpiece such as a gear blank 11 which is illustrated as being an integral part of an elongated shaft 12. The tool includes a conical steel body 13 with a plurality of teeth 14 spaced angularly around the periphery of the body. The tool is adapted to be mounted on a spindle adapter 15 and is turned about the axis a of the spindle and the body while the work is turned in synchronism about an axis b which, in this instance, is parallel to the axis a. During such turning, the tool is reciprocated longitudinally relative to the work and, during its downstroke, is brought into cutting engagement with the work to cut teeth in the work. The teeth on the tool and the teeth which are cut in the workpiece are conjugate forms so that the teeth on the workpiece are generated during the cutting operation and, in the case of a gear being shaped, these forms are involutes.

The tool body 13 has a central bore 16 (FIG. 2) which is received on the cylindrical portion 17 of the spindle adapter 15 with the body abutting a spacer 18 which also is received on the cylindrical portion 17 and which abuts a shoulder 19 of the spindle adapter. At its outer end, the tool body 13 is counterbored as indicated at 20 to receive a washer 21 and the head 22 of a locking screw 23. The latter is threaded into the outer end portion 17 of the spindle and, when tightened, clamps the tool body against the shoulder 19 of the spindle adapter.

The edges of the teeth 14 of the body 13 are formed by the intersection of one face 24 of the body with the ends 25 and sides 26 of the teeth and with the roots 27. The face 24 is on the larger end of the conical body 13. The ends 25 and the roots 27 of the teeth 14 are inclined inwardly away from the face to provide a back or relief angle c (FIG. 3) which usually is between 4 and 8 degrees with 8 degrees generally being a suitable angle. The sides 26 of each tooth 14 converge toward each other as they progress upwardly so as to not rub the work 11 during cutting.

To avoid the need of resharpening the cutting edges of the tool 10 when the cutting edges become dull, the cutting edges are formed on a thin metal wafer 30 which is fixed removably to and conforms to the shape of the face 24 of the body 13, the latter basically being the same body as that of a solid tool. The wafer is provided with a plurality of teeth 31 backed rigidly by the teeth 14 on the body 13 and is held removably against the face 24. When the cutting edges become dull, the wafer 30 is removed and replaced with another one. The sides 32 and the ends 33 of the teeth 31 of the wafer and the roots 34 in between are disposed relative to the plane of the wafer so that these edges generally match respectively the sides 26 and ends 25 of the body teeth 14 and the roots 27. Preferably, the teeth on the wafer are larger than the teeth on the body so that a narrow margin 35 (e.g., 0.0025") of the ends, sides and roots of the wafer teeth extend slightly beyond the corresponding portions of the teeth on the body as shown in FIG. 4. The wafer preferably is made from a thin (e.g., about 0.050") sheet of tool steel which is subsequently hardened and coated with a thin film of titanium nitride. The aforementioned patent discloses a method by which the wafer may be formed.

In accordance with the present invention, the wafer 30 is bonded directly to the face 24 of the body 13 by a layer of high strength adhesive. By virtue of bonding the wafer to the body, the need for clamping rings or the like on the lower or working face of the wafer may be avoided. Thus, the working face of the wafer is completely exposed and unobstructed and, as a result, there is nothing ahead of the working face to create an axial interference when the tool 10 is reciprocated. Thus, the tool may, for example, cut a gear 11 which is located closely adjacent another gear 36 (FIG. 1) on the shaft 12 without striking the gear 36 when the tool reaches the bottom of its stroke.

The preferred bonding adhesive which is used is a high shear strength, structural, single component, anaerobic, self-curing resin such as polyester or acrylic. One example of a suitable polyester adhesive is LOCTITE 324 which has a tensile shear strength of about 4,000 pounds per square inch with a 0.003 inch maximum clearance between the face 24 and the wafer 30 at the bond line. While such an adhesive will cure at room temperature, a heat cure at between 200 and 300 degrees F. provides greater strength and reduced curing time. When the cutting edges of the teeth 31 of the wafer 30 become dull, the assembly may be heated at a temperature of about 500–600 degrees F. to destroy the bond and permit removal and replacement of the wafer.

While the face 24 of the tool body 13 could be flat and planar, it herein is shown as being concave and specifically as being the surface of a cone with a face angle d (FIG. 3) of between 5 and 10 degrees, 5 degrees being customary in most applications. While the wafer 30 is being bonded to the face 24, the wafer is fixtured or clamped in a flexed position so that its upper or inactive face is pressed into intimate face-to-face conformity with the conical face in order to provide the teeth 31 with a positive rake. The ends 33 of the teeth 31 on the wafer 30 are formed at an angle e (FIG. 3) relative to the working face of the wafer so that these ends provide a back or relief angle when the wafer is bonded to the face 24 of the body 13. In the specific cutter 10 which has been illustrated, the angle which the ends 33 make after the wafer is flexed against and is bonded to the conical face 24 is the same as the angle c made by the teeth 14 on the body 13. Thus, the angle e is equal to the sum of the face angle d and the outside relief angle c so that, when the wafer is flexed, only the portion corresponding to the angle c remains relative to a line parallel to the axis a of the body 13. For example, if a face angle d of 5 degrees and an outside relief angle c of 8 degrees are used, the angle e formed on the ends 33 of the teeth 31 of the wafer 30 is 13 degrees. By forming the teeth 31 with the angle e, the sides 32 of the wafer teeth and the roots 34 thereof are also angled back so that they do not rub the workpiece 11 during cutting. As shown in FIG. 2, the ends 33 of the lower faces of the teeth 31 define the lowermost extremity of the tool 10.

Bonding of the wafer 30 to the body 13 not only eliminates axial obstructions on the forward end of the cutter 10 but also effects a more rigid joint between the body and all parts of the wafer. As a result, lateral or circumferential deflection of the wafer teeth 31 during cutting is reduced so as to improve the accuracy of the cutting process.

I claim:

1. A tool for cutting metal, said tool comprising an elongated body having a circular cross-section and a forward end surface, a plurality of radially projecting teeth formed on the periphery of said body adjacent said forward end surface and spaced angularly around said body, a thin sheet metal wafer disposed in face-to-face relation with said forward end surface of said body and having a plurality of radially projecting cutting teeth spaced angularly around its periphery, the number of cutting teeth on said wafer being equal to the number of teeth on said body, each cutting tooth on said wafer being alined angularly with one of the teeth on said body, the cutting teeth on said wafer being larger at their ends, sides and roots than the corresponding teeth on said body whereby the cutting teeth on the wafer extend slightly beyond the ends, sides and roots of the teeth on said body, bonding means located between said wafer and the forward surface of said body for bonding said wafer in rigid face-to-face relation with said forward surface whereby the cutting teeth on said wafer are backed by the teeth on said body and are operable to cut a workpiece as said body is advanced forwardly.

2. A tool as defined in claim 1 in which the entire forward faces of the teeth on said wafer are exposed and in which the ends of the cutting teeth on the wafer define the forwardmost extremity of said tool.

3. A tool as defined in claim 1 in which the forward end surface of said body is concave, said wafer being flexible and being flexed into conformity with said concave forward end surface, said bonding means holding said wafer in a flexed condition against and in conformity with said forward end surface.

4. A tool as defined in claim 1 in which said bonding means comprises a thin layer of high strength anaerobic resin located between said wafer and the forward face of said body.

5. A tool for cutting metal, said tool comprising an elongated body having a circular cross-section and a forward end surface, said forward end surface being concave, a plurality of radially projecting teeth formed on the periphery of said body adjacent said forward end surface and spaced angularly around said body, a thin and flexible sheet metal wafer located forwardly of said forward end surface of said body and having a plurality of radially projecting cutting teeth spaced angularly around its periphery, the number of cutting teeth on said wafer being equal to the number of teeth on said body, each cutting tooth on said wafer being alined angularly with one of the teeth on said body, the cutting teeth on said wafer being larger at their ends, sides and roots than the corresponding teeth on said body whereby the cutting teeth on the wafer extend slightly beyond the ends, sides and roots of the teeth on said body, the ends, sides and roots of the cutting teeth on said wafer being inclined inwardly toward said body to form back angles, bonding means located between said wafer and the concave forward surface of said body for bonding said wafer in a flexed condition and in rigid face-to-face conformity with said concave forward surface whereby the cutting teeth on said wafer are backed by the teeth on said body and are operable to cut a workpiece as said body is advanced forwardly, the entire forward faces of the teeth on said wafer being exposed and having outer end portions which define the forwardmost extremity of said tool.

6. A tool as defined in claim 5 in which said bonding means comprises a thin layer of high strength anaerobic resin located between said wafer and the forward face of said body.

* * * * *